United States Patent [19]

Fujimura et al.

[11] Patent Number: 5,333,906
[45] Date of Patent: Aug. 2, 1994

[54] SEAT BELT RETRACTOR

[75] Inventors: Yoshiichi Fujimura, Echi; Shizutaka Matsuura, Hikone, both of Japan

[73] Assignee: Takata Corporation, Tokyo, Japan

[21] Appl. No.: 847,336

[22] Filed: Mar. 6, 1992

[30] Foreign Application Priority Data

Mar. 11, 1991 [JP] Japan .................................. 3-45013

[51] Int. Cl.⁵ .......................................... B60R 22/36
[52] U.S. Cl. .................................. 280/806; 242/382.6; 297/478; 297/480
[58] Field of Search ................ 280/806, 807; 297/474, 297/475, 478, 480; 242/107.4 C, 107.6, 107.7

[56] References Cited

U.S. PATENT DOCUMENTS

| | | | |
|---|---|---|---|
| 3,074,761 | 1/1963 | Ryan | 297/478 |
| 4,350,313 | 9/1982 | Adomeit | 242/107.4 C |
| 4,673,144 | 6/1987 | Byford | 242/107.4 C |
| 4,796,918 | 1/1989 | Meyer et al. | 280/807 |

FOREIGN PATENT DOCUMENTS 1141147 6/1989 Japan .

*Primary Examiner*—Margaret A. Focarino
*Assistant Examiner*—Paul Dickson
*Attorney, Agent, or Firm*—Armstrong, Westerman, Hattori, McLeland & Naughton

[57] ABSTRACT

In a seat belt retractor according to the present invention, a first protruding shaft of a reel shaft is loosely fitted into a recess, which is formed in an end of an output shaft, in such a manner that there is a prescribed gap between the shaft and the inner wall of the recess. The output shaft and the reel shaft are loosely fitted together so as to be capable of moving relative to each other in the axial direction but incapable of rotating relative to each other in the rotational direction. Accordingly, the reel shaft is capable of pivoting about the end of the first protruding shaft, which is the loosely fitted end. When the reel shaft pivots in this manner, the teeth of a ratchet on one side engage with teeth formed on a wall on the same side.

9 Claims, 11 Drawing Sheets

SEAT BELT RETRACTOR

BACKGROUND OF THE INVENTION

This invention relates to a seat belt apparatus installed in a vehicle such as an automobile for protecting a passenger. More particularly, the invention relates to a seat belt retractor in which a reel shaft, which takes up the seat belt, is locked against rotation by movement of the reel shaft in the event of an emergency to prevent the seat belt from being pulled off the reel shaft.

In order to prevent a seat belt from being pulled off a reel shaft by inertial motion of a passenger in the event of an emergency, such as when a large deceleration acts upon the vehicle, the conventional seat belt retractor installed in a vehicle such as an automobile is provided with locking means for locking the reel shaft, which takes up the seat belt, against rotation.

One example of such reel-shaft locking means is as disclosed in the specification and drawings of U.S. Pat. No. 4,796,918. Specifically, frame locking-type locking means is disclosed in which teeth are formed on a reel shaft and on a frame supporting the reel shaft. When deceleration greater than a predetermined value acts upon the vehicle, the reel shaft moves so that its teeth mesh with the teeth on the frame, thereby locking the reel shaft against rotation. This frame locking-type locking means can be formed so as to be comparatively light in weight because the teeth are formed on the frame; therefore, a special member having such teeth is unnecessary. Accordingly, such locking means is fully capable of lending itself to a reduction in weight presently demanded in vehicles such as automobiles.

It is desired that a retractor equipped with such frame locking-type locking means be provided with a comfort device of the kind disclosed in the specification of Japanese Patent Application Laid-Open (KOKAI) No. 1-141147, by way of example. However, since the conventional locking means of the frame locking type is so adapted as to move in a direction parallel to the reel shaft, it is difficult to mount the comfort device in the conventional retractor. Similarly, with the conventional retractor, it is difficult to mount other accessory devices besides the comfort device.

SUMMARY OF THE INVENTION

An object of the present invention is to provide a seat belt retractor in which an accessory device such as a comfort device can be attached even if the retractor is equipped with locking means of the frame locking type.

According to the present invention, the foregoing object is attained by providing a seat belt retractor for use in a vehicle and having at least a reel shaft which receives the biasing force of a spring for taking up a seat belt, and a frame for supporting the reel shaft, and which is equipped with frame locking-type locking means in which, when deceleration in excess of a predetermined value acts upon the vehicle, the reel shaft moves so that teeth, which are formed on the reel shaft, engage with teeth formed on the frame, thereby locking the reel shaft against rotation, characterized in that one end of the two ends of the reel shaft is freely rotatably secured to the frame so that the reel shaft pivots about the one end when deceleration in excess of a predetermined value acts upon the vehicle, whereby teeth formed on the other end of the reel shaft engage with the teeth of the frame.

In another aspect of the invention, the seat belt retractor is characterized in that the reel shaft is supported, at both its ends, on the frame, the teeth of the reel shaft are formed on both ends thereof, the teeth on the frame are formed to oppose respective ones of the teeth on the reel shaft, the reel shaft is attached to the frame so as to be capable of pivoting about a portion offset from the central axis of the reel shaft, and pivoting impeding means for preventing one end of the reel shaft from pivoting relative to the frame is provided on the frame where the one end of the reel shaft is located, wherein when deceleration in excess of the predetermined value acts upon the vehicle, the other end of the reel shaft pivots so that the teeth on the other end of the reel shaft engage with the teeth of the frame opposing these teeth, and wherein when a pulling force in excess of a predetermined value acts upon the seat belt, the pivoting impeding means allows pivoting of the one end of the reel shaft, whereby the reel shaft moves so that the teeth on both ends thereof engage with the respective ones of opposing teeth on the frame.

Further, the invention is characterized in that the one end of the reel shaft is provided with a comfort device.

In the seat belt retractor according to the present invention constructed as set forth above, the reel shaft pivots about its one end and the teeth on the other end mesh with the teeth on the frame at the time of ordinary locking, such as when sudden braking is applied, as a result of which the reel shaft is locked against rotation. Consequently, the seat belt is locked and is reliably prevented from being pulled off the reel shaft. In this case, the reel shaft merely pivots about its one end, and therefore this end hardly moves. By adopting such an arrangement in which the one end of the reel shaft does not move at the time of ordinary locking, an accessory device such as a comfort device can be simply mounted on a retractor equipped with locking means of the frame locking-type.

In particular, according to the invention, the pivoting impeding means allows pivoting of one end of the reel shaft when a very large pulling force acts upon the seat belt. As a result, the reel shaft moves substantially parallel to a direction perpendicular to the axis of the reel shaft so that the teeth formed on both ends of the reel shaft engage with the opposing ones of the teeth on the frame. Accordingly, rotation of the reel shaft is impeded more strongly when a very large pulling force acts upon the seat belt, and therefore the seat belt is prevented from being pulled off the reel shaft with even greater assurance. As a result, the passenger is restrained in highly reliable fashion.

Further, in accordance with the present invention, even through the seat belt retractor is equipped with locking means of the frame locking type, it is still capable of being provided with the function of a comfort device.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENT

Figure 1:
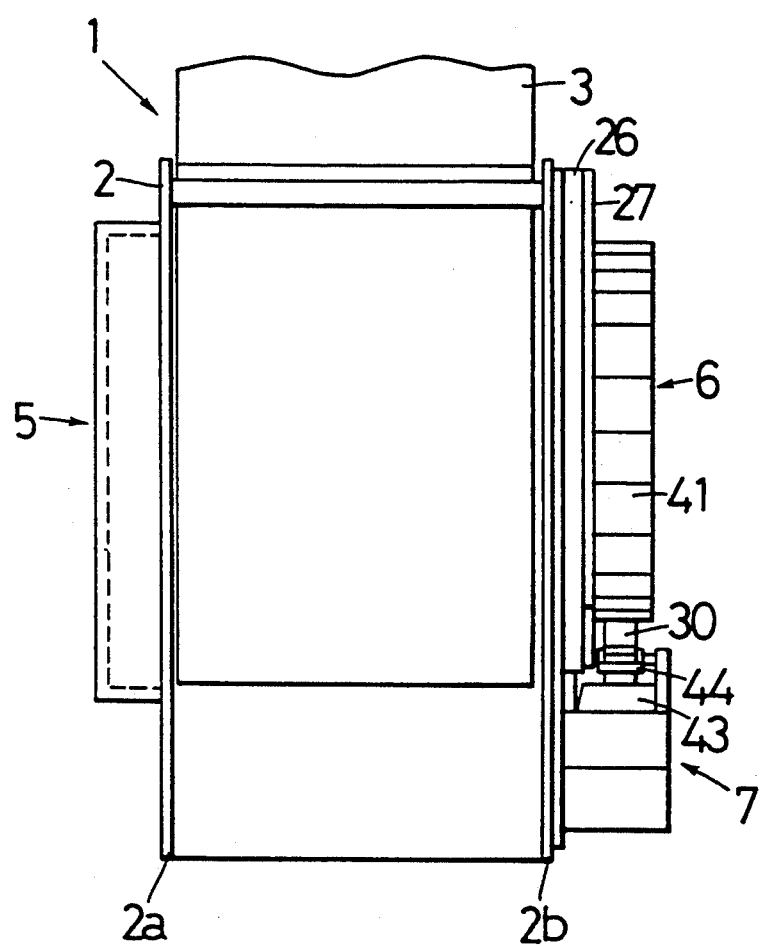
FIG. 1 is front view illustrating an embodiment of a seat belt retractor according to the present invention.
Figure 2:
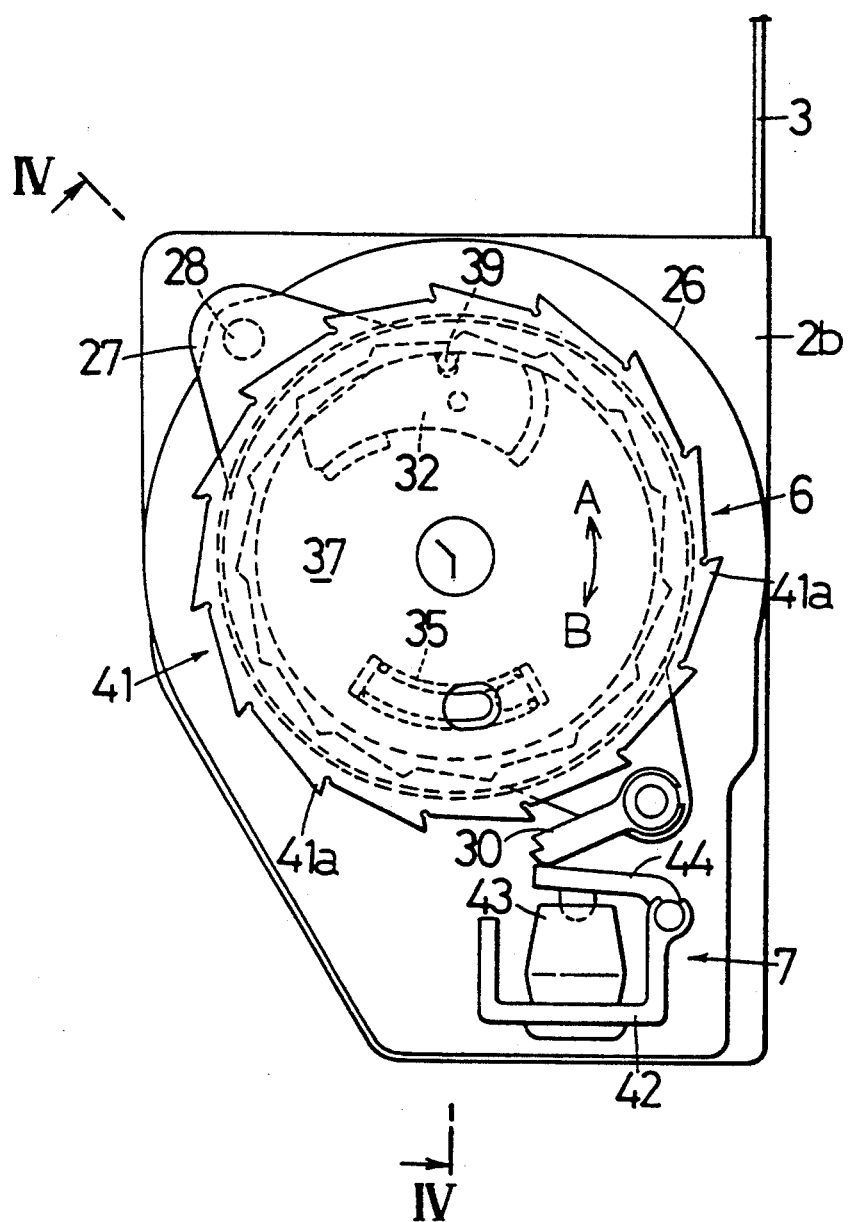
FIG. 2 is a side view of the embodiment.
Figure 3:
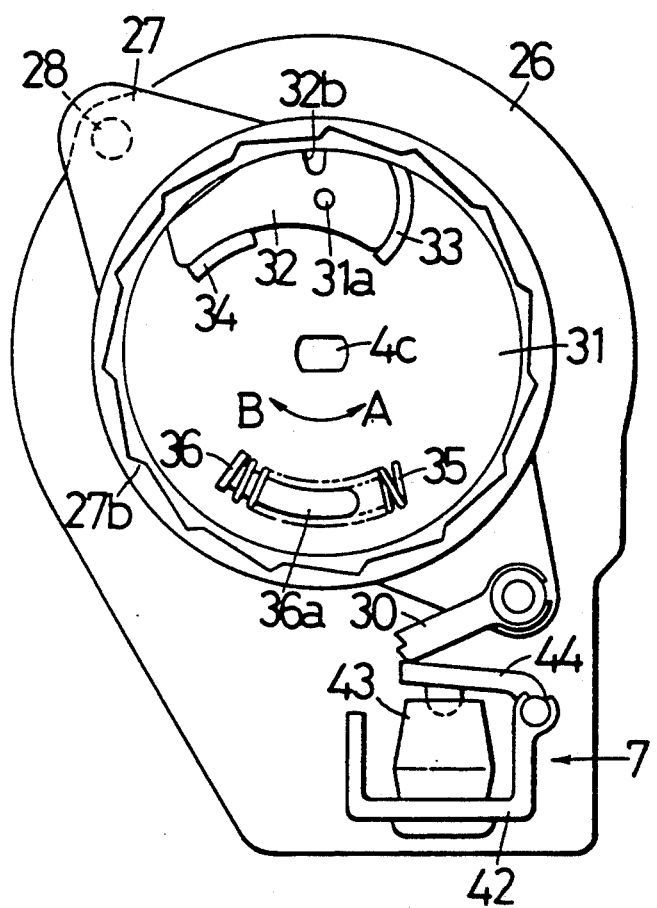
FIG. 3 is a diagram clearly showing part of the mechanism of a seat belt locking mechanism from which a flywheel shown in FIG. 2 has been removed.
Figure 4:
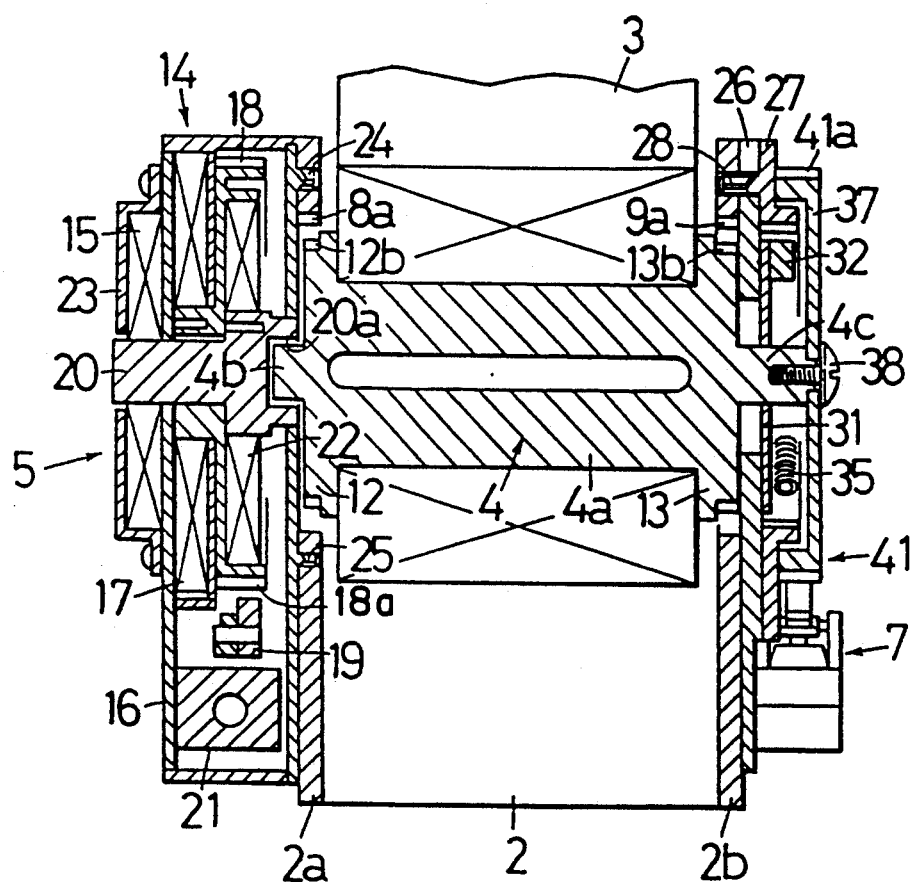
FIG. 4 is a sectional view taken along line IV—IV in FIG. 2.

FIG. 1 is front view illustrating an embodiment of a seat belt retractor according to the present invention, FIG. 2 is a side view of the embodiment, FIG. 3 is a diagram clearly showing part of the mechanism of a seat belt locking mechanism from which a flywheel shown in FIG. 2 has been removed, and FIG. 4 is a sectional view taken along line IV—IV in FIG. 2.

As illustrated in FIGS. 1 through 4, a seat belt retractor 1 according to this embodiment is equipped with a generally U-shaped frame 2 having left and right side walls 2a, 2b. A reel shaft 4 which takes up a seat belt 3 is arranged along back wall 2c and between the left and right side walls 2a, 2b of the frame 2. Biasing-force applying means 5 which applies a force to the reel shaft 4 for taking up the seat belt 3 on the reel shaft is attached to the left side wall 2a. Seat-belt lock actuating means 6 is attached to the right side wall 2b, which is provided with deceleration sensing means 7. When a predetermined deceleration acts upon the vehicle, the deceleration sensing means 7 senses this deceleration and actuates the seat-belt lock actuating means 6.

Figure 5:
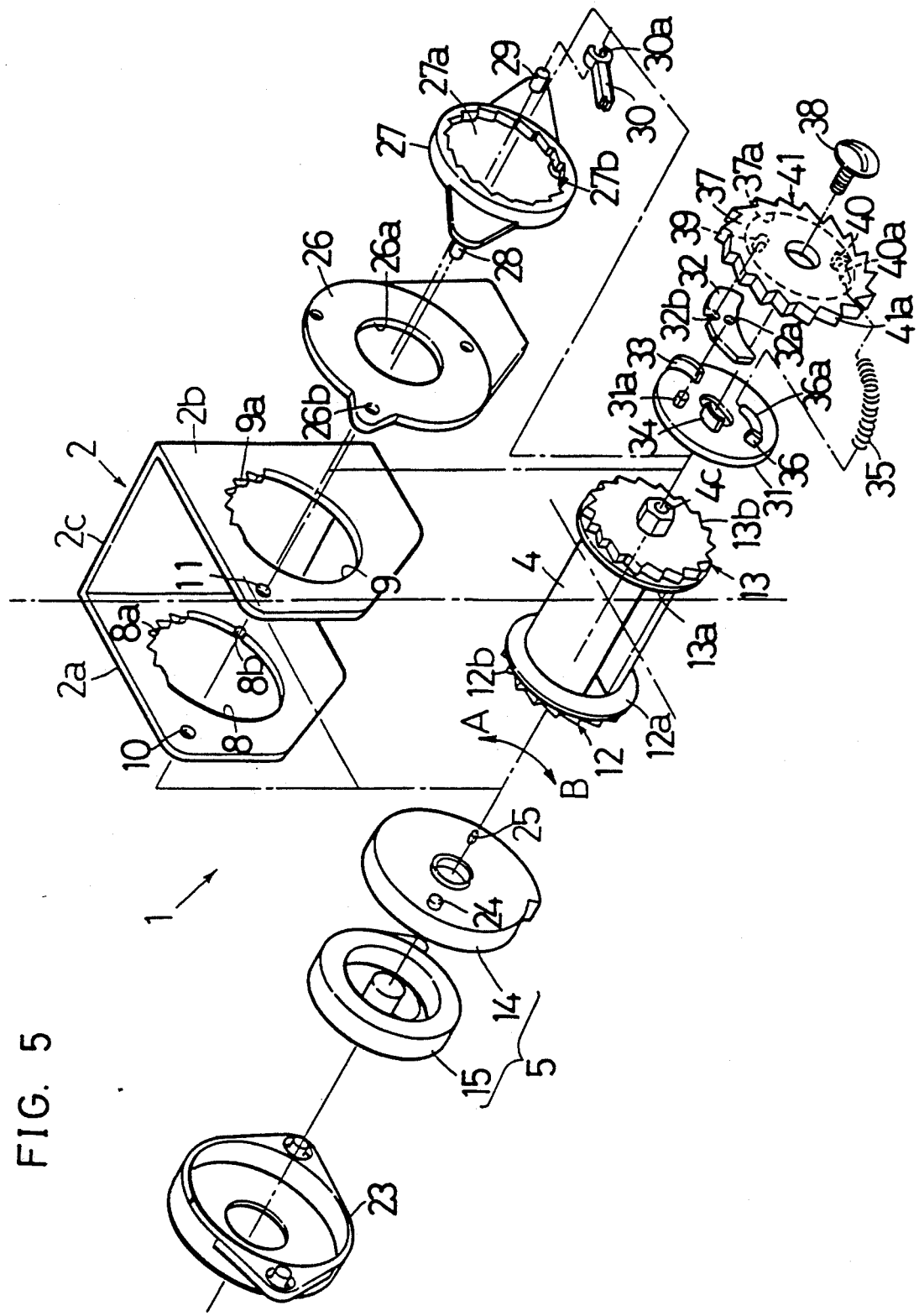
FIG. 5 is an exploded perspective view illustrating the seat belt retractor of this embodiment.

FIG. 5 is an exploded perspective view showing the reel shaft 1 of the embodiment. The various members constituting the reel shaft 1 will be described in detail with reference also to FIG. 5.

As shown in FIG. 5, the left and right side walls 2a, 2b of the frame 2 are provided with respective circular holes 8, 9 whose diameters are comparatively large and equal. The circular holes 8, 9 are formed at the same positions of the left and right side walls 2a, 2b so as to oppose each other. As clearly illustrated in FIGS. 6, 5 and 7 the upper right-hand portions of the inner peripheral surfaces of the circular holes 8, 9 are formed to have a plurality of teeth 9a, respectively. Each of the plurality of teeth 8a, 9a is identically shaped and is approximately triangular in form. The tooth face opposing the A direction, which is that in which the seat belt is pulled off, defines a comparatively steep slope, while the tooth face opposing the B direction, which is that in which the seat belt is taken up, defines a comparatively gentle slope.

Further, the left side wall 2a is formed to have a notch 8b situated in the lower right portion of the inner peripheral surface of circular hole 8, and with circular holes 10, 11, of comparatively small diameter, provided in the left and right side walls 2a, 2b, respectively, in the upper left hand portions thereof. The circular holes 10, 11 also are formed in the left and right side walls 2a, 2b at the same positions so as to oppose each other.

Figure 6:
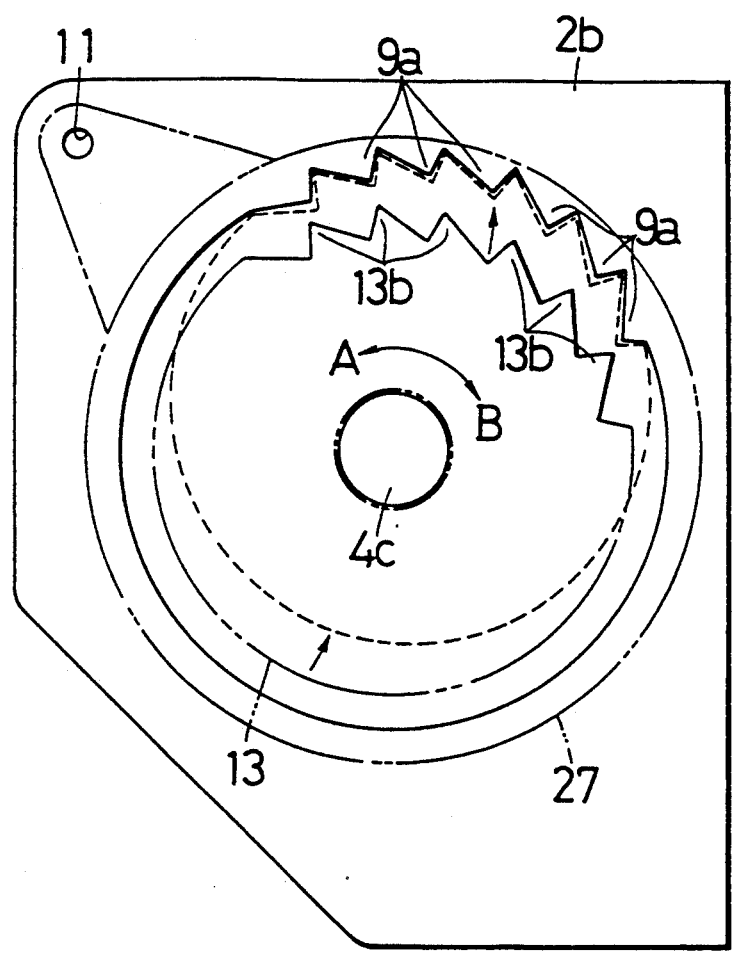
FIG. 6 is a diagram for describing engagement between the teeth of a reel shaft and the teeth of a frame.

The left and right ends of the reel shaft 4 which takes up the seat belt 3 are provided with respective ratchets 12, 13 having respective flanges 12a, 13a. The ratchets 12, 13 have respective teeth 12b, 13b which are triangular and opposite in shape to the teeth 8a, 9a of the circular holes 8, 9, respectively. Specifically, the tooth face opposing the A direction defines a comparatively gentle slope, while the tooth face opposing the B direction, which is that in which the seat belt is taken up, defines a comparatively steep slope. In this case, the teeth 12b, 13b are formed to have approximately the same pitch as the teeth 8a, 9a. Therefore, when the reel shaft 4 moves, the teeth 12b, 13b mesh almost perfectly with the teeth 8a, 9a, as illustrated in FIG. 6.

Furthermore, as shown in FIG. 4, first and second protruding shafts 4b, 4c are provided on the left and right ratchets 12b, 13b of the reel shaft 4 and are coaxial with a take-up portion 4a of the shaft 4.

The reel shaft 4 has its take-up portion 4a situated in the left and right side walls 2a, 2b of the frame 2 and is so arranged as to pass through the circular holes 8, 9 in the left and right side walls 2a, 2b. In this case, the arrangement is such that the teeth 12b, 13b of the left and right ratchets 12, 13 oppose respective ones of the teeth 8a, 9a of the circular holes 8, 9.

The biasing force applying means 5 can be one which is the same as that disclosed in the specification of Japanese Patent Application Laid-Open No. 1-141147, by way of example. In the embodiment described herein, the biasing force applying means 5 set forth in the specification of Japanese Patent Application Laid-Open No. 1-141147 is used. Though the details of the biasing force applying means 5 are not described, suffice it to say that the means includes a comfort device 14 and a main spring 15 mounted on the left side wall 2a.

As illustrated in FIG. 4, the comfort device 14 has an accessory spring 17 within a case 16. The accessory spring 17 has its inner end fastened to a clutch gear 18 so that the clutch gear 18 is biased in the take-up direction of the seat belt 3. The clutch gear 18 is formed as a one-way clutch and has a clutch pawl 19 which locking engages with a tooth portion 18a in one direction. Specifically, the clutch pawl 19 engages with the tooth portion 18a in the take-up direction B of the seat belt 3 to impede the rotation, in the B direction, of an output shaft 20 in the biasing force applying means 5. The clutch pawl 19 does not engage with the tooth portion 18a in the A direction, which is that in which the seat belt 3 is pulled off, and therefore allows the output shaft 20 to rotate in this direction. The clutch pawl 19 ordinarily is set at a position at which the one-way clutch is in the inoperative state. By energizing an electromagnetic solenoid 21, a force is applied to the clutch pawl 19 to move it to a position at which the one-way clutch is operative.

The comfort device 14 has a helical pull-off adjusting tape 22 the outer end of which is connected to the clutch gear 18 and the inner end of which is connected to the output shaft 20.

The main spring 15 is arranged on the outer side of the comfort device 14. The inner end of the spring 15 is connected to the output shaft 20 so that the reel shaft 4 is biased at all times in the direction B, which is that in which the seat belt 3 is taken up. The main spring 15 is covered by a cover 23 fixed to the case 16.

The case 16 is formed to include a pivot pin 24 and a shear pin 25. The pivot pin 24 is fitted into the circular hole 10 of the frame 2, whereby the case 16 is supported on the left side wall 2a so as to be capable of oscillating about the pivot pin 24. The shear pin 25 is fitted into the notch 8b, and therefore the case 16 is incapable of oscillating under ordinary conditions. The shear pin 25 is so adapted as to break off when subjected to a shearing force in excess of a predetermined value. When the shear pin 25 breaks off, the urging force applying means 5 is capable of oscillating about the pivot pin 24.

In this embodiment, the first protruding shaft 4b of the reel shaft 4 is loosely fitted into a recess 20a, which is formed in an end of the output shaft 20, in such a manner that there is a prescribed gap between the shaft 4b and the inner wall of the recess 20a, as depicted in FIG. 4. In this case, the output shaft 20 and the reel shaft 4 are loosely fitted together so as to be capable of moving relative to each other in the axial direction but incapable of rotating relative to each other in the rotational direction. Accordingly, the biasing force of the biasing force applying means 5 is capable of being transmitted to the reel shaft 4 via the output shaft 20. Further, as indicated by the two-dot chain line in FIG. 7, the reel shaft 4 is capable of pivoting about the end of the first protruding shaft 4b, which is the loosely fitted portion of the shaft 4. When the reel shaft is thus pivoted, the teeth 13b of the ratchet wheel 13 on the right side engage with the teeth 9a of the right side wall 2b.

A bed plate 26 is fixed to the right side wall 2b by screws (not shown). The bed plate 26 is provided with a comparatively large circular hole 26a coaxial with the circular holes 8, 9, and with a circular hole 26b coaxial with the circular holes 10, 11. A locking plate 27 is disposed alongside the bed plate 26. In this case, a pivot pin 28 is projectively provided on the locking plate 27 on the side thereof facing the frame 2. The pivot pin 28 is fitted into the circular hole 11 of the right side wall 2b upon being passed through the circular hole 26b of the bed plate 26. Thus, the locking plate 27 is capable of rocking back and forth about the pivot pin 28.

The central portion of the locking plate 27 is provided with a circular hole 27a that is coaxial with the holes 8, 9, 26a, and the inner peripheral surface of the circular hole 27a is formed to have teeth 27b that are substantially triangular in shape. A tooth face opposing the A direction, which is that in which the seat belt 3 is pulled off, defines a comparatively steep slope, while the tooth face opposing the B direction, which is that in which the seat belt 3 is taken up, defines a comparatively gentle slope. Further, the locking plate 27 on the side thereof opposite the pivot pin 28 is provided with a support shaft 29 on which a first recess 30a of locking pawl 30 is supported so as to pivot freely.

A disk-shaped locking-pawl mounting plate 31 is fixedly fitted onto the second protruding shaft 4c of the reel shaft 4 so as to be incapable of rotating relative to the shaft 4c. As illustrated in FIG. 3, the locking-pawl mounting plate 31 is so designed that the size thereof along the perimeter is slightly smaller than the size of the circular hole 27a of the locking plate 27. In the installed state, the mounting plate 31 is situated within the circular hole 27a. The locking-pawl mounting plate 31 is provided with a protruding support shaft 31a that is fitted into a hole 32a in a second locking-pawl 32, whereby the pawl 32 is supported so as to be free to pivot. The distal end of the second locking pawl 32 is arranged to oppose the teeth 27b of the locking plate 27. The arrangement is such that when the second locking pawl 32 pivots in the take-up direction B, its distal end engages the teeth 27b so that the locking plate 27 and locking-pawl mounting plate 31 are incapable of rotating relative to each other. The second locking pawl 32 is formed to have a notch 32b.

The locking-pawl mounting plate 31 is further provided with a member 33 which, when the second locking pawl 32 engages with the teeth 27b, supports a reaction force from the locking plate 27 which receives the second locking pawl 32, a stopper 34 which limits the rotation of the second locking pawl 32 in the A direction to a certain amount, and a spring shoe member 36 for supporting one end of a coil spring 35. The coil shoe member 36 is provided with a guide portion 36a for guiding the coil spring 35.

A flywheel 37 is arranged alongside the locking plate 27 and locking-pawl mounting plate 31. The flywheel 37 is rotatably supported on the second protruding shaft 4c of the reel shaft 4 by a screw 38. A circular recess 37a is formed in the flywheel 37 in the surface thereof that is on the side of the locking-pawl mounting plate 31. The teeth 27b of the locking plate 27 and the locking-pawl mounting plate 31 are situated within the recess 37a.

A protruding engagement pin 39 is provided in the recess 37a of flywheel 37 and is fitted into the notch 32b of the second locking pawl 32. When the flywheel 37 is rotated in the B direction relative to the locking-pawl mounting plate 31, the second locking pawl 32 is pivoted in the B direction by the engagement pin 39 and assumes a position at which it is capable of engaging the teeth 27b of the locking plate 27. When the flywheel 37 is rotated in the A direction relative to the locking-pawl mounting plate 31, the second locking pawl 32 is pivoted in the A direction by the engagement pin 39 and assumes a position at which it is incapable of engaging the teeth 27b of the locking plate 27.

A spring shoe member 40 for supporting the other end of a coil spring 35 is provided in the recess 37a of the flywheel 37. The coil shoe member 40 is provided with a guide portion 40a for guiding the coil spring 35. The coil spring 35 is installed in the compressed state. Accordingly, the flywheel 37 is biased in the A direction at all times. In this case, the second locking pawl 32 also is biased in the A direction via the engagement pin 39. Under ordinary conditions, the second locking pawl 32 is in abutting contact with the stopper 34.

In the state in which the second locking pawl 32 is in abutting contact with the stopper 34, the flywheel 37 is impeded from rotating any further, relative to the locking-pawl mounting plate 31, in the A direction. As a result of rotating the second locking pawl 32 in the B direction to bring it into abutting contact with the teeth 27b, the flywheel 37 is impeded from rotating in the B direction relative to the locking-pawl mounting plate 31.

The outer circumferential surface of the flywheel 37 is provided with a ratchet 41 having teeth 41a. The tooth face opposing the A direction, which is that in which the seat belt 3 is pulled off, defines a comparatively gentle slope, while the tooth face opposing the B direction, which is that in which the seat belt 3 is taken up, defines a steep gentle slope.

As shown in FIG. 2, the deceleration sensing means 7 is attached to the right side wall 2b and is equipped with an inertial body 43 placed upon a support base 42 so as to be free to rock back and forth, and an actuator 44 turnably attached to the support base 42. When deceleration of a prescribed magnitude acts upon the vehicle, the inertial body 43 tilts forwardly. Owing to this forward tilting motion of the inertial body 43, the actuator 44 turns in the B direction so that the first locking pawl 30 is pivoted in the B direction. Owing to this pivoting of the first locking pawl 30 in the B direction, the pawl 30 is set at a position at which it is capable of engaging the teeth 41a of the ratchet 41 in the flywheel 37.

The operation of this embodiment constructed as set forth above will now be described.

Described first will be the ordinary operating state, in which deceleration in excess of a predetermined value does not act upon the vehicle.

In this state, the deceleration sensing means 7 does not operate, the first locking pawl 30 is set at a position at which it does not engage the teeth 41a of the ratchet 41, and the seat belt retractor 1 assumes the state illustrated in FIGS. 1 through 4. In this state, since the flywheel 37 is urged in the A direction at all times relative to the locking-pawl mounting plate 31 owing to the biasing force of the coil spring 35, the second locking pawl 32 is held in the position at which it is in abutting contact with the stopper 34 and does not engage with the teeth 27b.

Under these conditions, therefore, the operation of the seat belt retractor 1 primarily is the operation of the urging force applying means 5. Since the operation of the urging force applying means 5 is disclosed in the aforementioned specification of Japanese Patent Application Laid-Open No. 1-141147, this operation will be described only in brief here.

Operation when the seat belt is in the unfastened state will be described.

In this state, the tongue (not shown) attached to the seat belt 3 and a buckle member (not shown) are not engaged with each other. Accordingly, since the biasing force of the main spring 15 is transmitted to the reel shaft 4 at all times via the output shaft 20, the reel shaft 4 is in a state in which it takes up the seat belt 3 owing to the biasing force of the main spring 15. In this case, the wound-up pull-off adjusting tape 22 is slackened owing to the rotation of the output shaft 20 in the seat-belt take-up direction B.

However, in the state in which the tongue and buckle member are disconnected, the electromagnetic solenoid 21 is in the de-energized state and therefore the clutch pawl 19 is held at a position at which it will not mesh with the teeth 18a of the clutch gear 18. That is, the one-way clutch is held at the inoperative position. Consequently, the clutch gear 18 is rotated in the take-up direction B by the biasing force of the accessory spring 17, thereby absorbing the slack in the pull-off adjusting tape 22. Accordingly, the pull-off tape 22 is wound up upon the output shaft 20 in a tensioned state and the biasing force of the accessory spring 17 in the take-up direction of the seat belt 3 is applied to the output shaft 20 via the tape 22. As a result, the force for taking up the seat belt 3 is enlarged so that the seat belt is taken up in reliable fashion.

Described next will the state in which the seat belt is pulled.

When the passenger pulls out the seat belt 3 in order to fasten it, this is accompanied by rotation of the reel shaft 4 and output shaft 20 in the seat belt pull-out direction A. As a result, the main spring 15 is wound and tightened and the accessory spring 17 is wound and tightened via the tensioned pull-off adjusting tape 22.

When the tongue of the seat belt 3 pulled out by the passenger is connected to the buckle member to fasten the seat belt 3, the electromagnetic solenoid 21 is energized so that the clutch pawl 19 is moved to the one-way clutch actuating position. As a result, with regard to rotation of the clutch gear 18 in the seat belt take-up direction B, the clutch pawl 19 and the teeth 18a of the clutch gear 18 mesh with each other, and therefore the biasing force of the accessory spring 17 in the take-up direction does not act upon the output shaft 20. When the seat belt 3 is pulled out, the rotation of the reel shaft 4 is accompanied by rotation of the locking-pawl mounting plate 31 and flywheel 37 of the seat belt lock actuating means 5 in the same direction. However, the locking-pawl mounting plate 31 and flywheel 37 merely turn without performing work.

Operation in the state in which the passenger's hand is removed from the seat belt after the tongue and buckle member have been connected together will now be described.

At the moment the passenger connects the tongue and the buckle member, the seat belt 3 is in a state in which the length thereof that has been pulled out is more than the normal length required for fastening. Therefore, when the passenger releases the seat belt 3 after the tongue and buckle member have been connected, the biasing force of the accessory spring 17 in the take-up direction acts upon the output shaft 20. As a result, the seat belt 3 is taken up solely by the biasing force of the main spring 15 until it has been snugly fitted to the body of the passenger. At this time, the pull-off adjusting tape 22 is slackened owing to rotation of the output shaft 20 in the take-up direction B, and therefore the force which the seat belt 3 applies to the passenger is a comparatively small force due solely to the biasing force of the main spring 15. Accordingly, pressure applied to the passenger by the seat belt 3 is alleviated. During vehicle travel, the seat belt retractor 1 maintains this state as long as deceleration in excess of a predetermined value does not act upon the vehicle.

The operation described next will be that in which the seat belt assumes the unfastened state after the tongue and buckle member are disconnected.

When the passenger disconnects the tongue and buckle member in order to leave the vehicle, the electromagnetic solenoid 21 is de-energized and the clutch pawl 19 moves to the position at which the one-way clutch is inactive. Consequently, the clutch gear 18 is suddenly rotated in the seat belt take-up direction B by the biasing force of the accessory spring 17 so that the slackened pull-out adjusting tape 22 is pulled tight. Accordingly, the reel shaft 4 is subjected to the biasing force of the accessory spring 17 in addition to the biasing force of the main spring 15, and therefore the reel shaft 4 reliably takes up the seat belt 3 by means of a large take-up force. Also, when the seat belt 3 is taken up, the rotation of the reel shaft 4 is accompanied by rotation of the locking-pawl mounting plate 31 and flywheel 37 of the seat belt lock actuating means 5 in the same direction. However, the locking-pawl mounting plate 31 and flywheel 37 merely turn without performing work.

Operation when deceleration greater than a predetermined value acts upon the vehicle will be described next.

Figure 8:
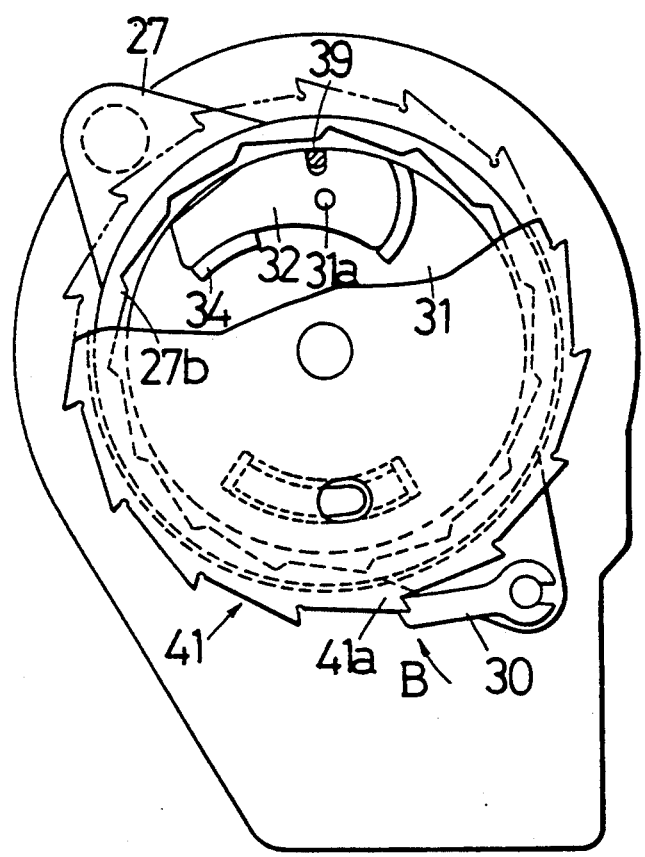
FIG. 8 is a diagram for describing the engagement of a first locking pawl with the teeth of a ratchet in a flywheel when deceleration in excess of a predetermined value acts upon a vehicle.

When deceleration greater than a predetermined value acts upon the vehicle as a result of, say, emergency braking during vehicle travel, the seat belt lock actuating means 6 operates. In a first stage of operation, the inertial body of the deceleration sensing means 7 tilts forwardly owing to deceleration, as a result of which the actuator 44 turns in the B direction. Consequently, the first locking pawl 30 pivots in the B direction and assumes a position at which it engages the teeth 41a of the ratchet 41, as shown in FIG. 8. Meanwhile, since the body of the passenger attempts to lunge forwardly due to this vehicle deceleration in excess of the predetermined value, the seat belt 3 is pulled but, in response thereto, the reel shaft 4, locking-pawl mounting plate 31 and flywheel 37 turn in the pull-out direction A.

However, because the teeth 41a of the ratchet 41 quickly engage the first locking pawl 30, the flywheel 37 soon stops turning in the pull-out direction A. As a result, only the reel shaft 4 and locking-pawl mounting plate 31 continue to turn in the pulling direction A, and hence relative turning motion develops between the locking-pawl mounting plate 31 and cam flywheel 37. In other words, the flywheel 37 turns relative to the locking-pawl mounting plate 31 in the B direction.

Figure 9:
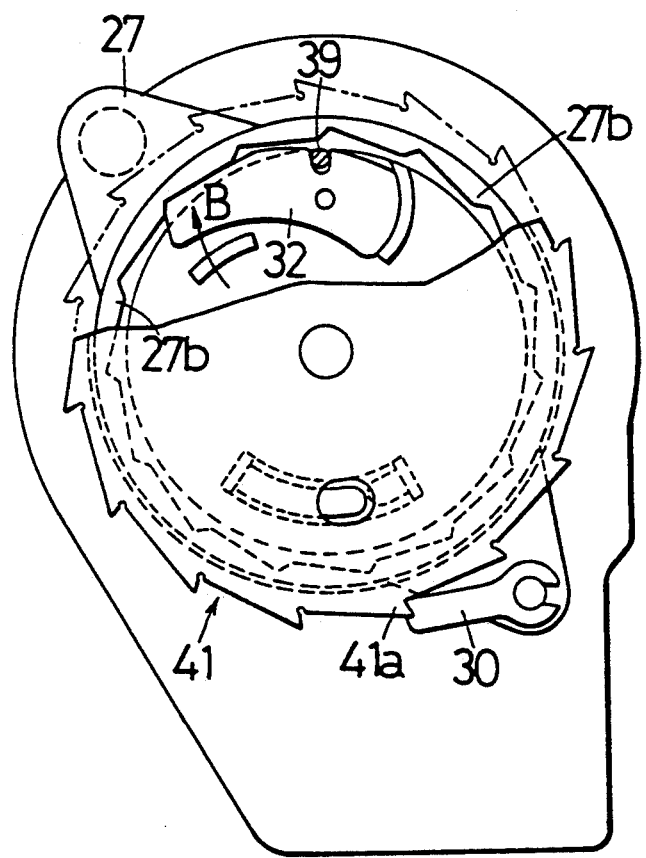
FIG. 9 is a diagram for describing the engagement of a second locking pawl with the teeth of a locking plate when deceleration in excess of a predetermined value acts upon a vehicle.

In a second stage of operation, the second locking pawl 32 pivots in the B direction and moves to a position at which it engages the teeth 27b of the locking plate 27 owing to the aforementioned relative turning motion. Further, as shown in FIG. 9, the second locking pawl 32 engages the teeth 27b owing to turning of the locking-pawl mounting plate 31 in the A direction. As a result of engagement between the second locking pawl 32 and teeth 27b, turning of the reel shaft 4 and locking-pawl mounting plate 31 is made impossible.

When the seat belt 3 is about to be pulled out, a force in the pull-out direction acts upon the reel shaft 4. This force is applied to the biasing-force applying means 5 from the reel shaft 4 via the output shaft 20, and therefore the biasing-force applying means 5 attempts to pivot about the pivot pin 24. As a consequence, a shearing force is applied to the shear pin 25 from the biasing-force applying means 5. In a case where the shearing force is less than the force needed to break off the shear pin 25, the turning of the biasing-force applying means 5 about the pivot pin 24 is impeded by the shear pin 25.

Figure 7:
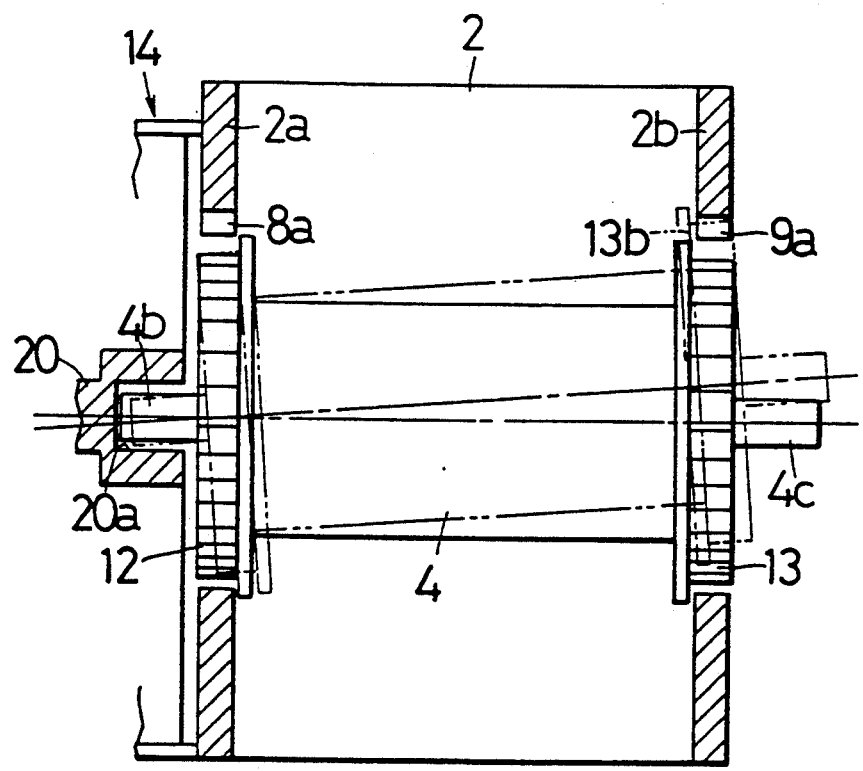
FIG. 7 is a diagram for describing the operation of ordinary locking to prevent pull-off of a seat belt.
Figure 10:
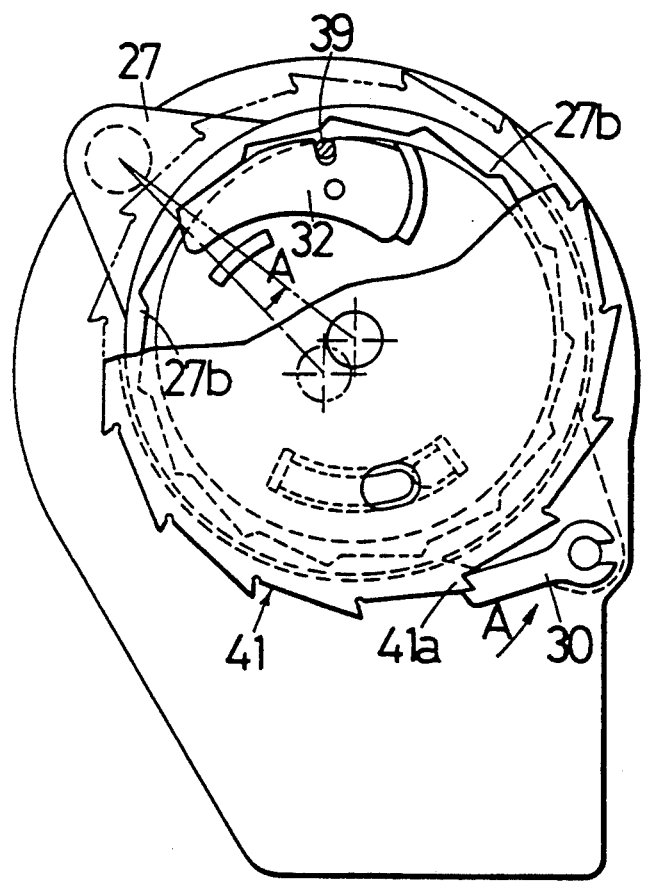
FIG. 10 is a diagram for describing the turning of seat-belt locking actuating means about a pivot pin when deceleration in excess of a predetermined value acts upon a vehicle.

Accordingly, since the reel shaft 4 is incapable of moving on the side of the biasing-force applying means 5, the reel shaft 4 pivots about the end of the first protruding shaft 4b, which is the end loosely fitted into the output shaft 20, as indicated by the two-dot chain line in FIG. 7. In other words, the other end of the reel shaft 4, namely the end on the side of the seat-belt lock actuating means 6, moves. Owing to this pivoting motion, the seat-belt lock actuating means 6 turns in the A direction about the pivot pin 28, as shown in FIG. 10, and the ratchet 13 moves toward the teeth 9a of the circular hole 9 so that the teeth 13a of the ratchet 13 mesh with the teeth 9a of the circular hole 9, as indicated by the dashed line in FIG. 6. In this case, the ratchet 13 is guided by the seat-belt lock actuating means 6, which turns about the pivot pin 28, and turns about the pivot pin 28 in similar fashion. This assures that the teeth 13a will mesh with the teeth 9a.

As a result, rotation of the reel shaft 4 in the seat belt pull-out direction A is impeded and the seat belt 3 is reliably prevented from being pulled out by forward motion of the passenger due to inertia. This assures that the passenger will be restrained and protected.

Described next will be operation in a state where a very large pulling force acts upon the seat belt.

Figure 11:
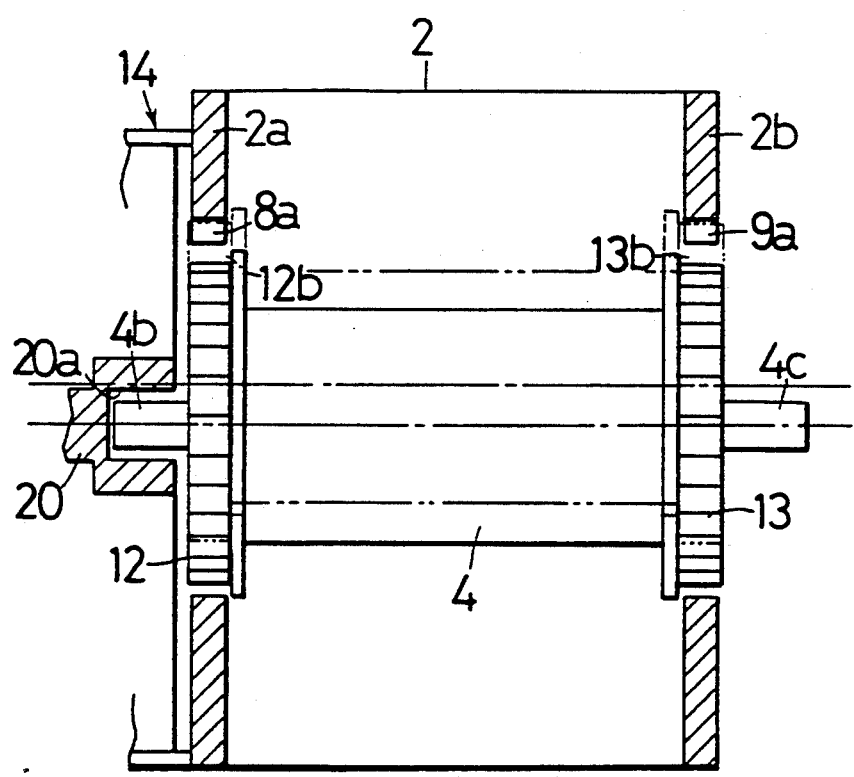
FIG. 11 is a diagram for describing the operation of locking to prevent pull-off of a seat belt in a case where the seat belt is subjected to a pulling force greater than a predetermined value.

When a very large deceleration acts upon the vehicle owing to a vehicular collision or the like, the deceleration sensing means 7 and seat-belt lock actuating means 6 are actuated and the teeth 13a of ratchet 13 mesh with the teeth 9a of circular hole 9, just as in the above-described case where deceleration in excess of a predetermined value acts upon the vehicle. At this time the forwardly acting inertial force of the passenger becomes very large and therefore a very large pulling force is applied to the seat belt 3. As a result of this large pulling force, the shearing force which acts upon the shear pin 25 becomes larger than the breakage force of the shear pin 25, the shear pin 25 breaks and the biasing-force applying means 5 turns in the A direction about the pivot pin 24. Consequently, the ratchet 12 on the left end of the reel shaft 4 also turns in the A direction about the pivot pin 24 so that the teeth 12b of the ratchet engage the teeth 8a of the left side wall 2a. Accordingly, as indicated by the two-dot chain line in FIG. 11, the reel shaft 4 undergoes translational motion to bring the teeth 12b, 13b of both ratchets 12, 13 into engagement with the teeth 8a, 9a of the left and right side walls 2a, 2b, respectively.

With the teeth 12b, 13b of both ratchets 12, 13 in engagement with the teeth 8a, 9a of the left and right side walls 2a, 2b, respectively, rotation of the reel shaft 4 in the pull-out direction A is strongly impeded. As a result, even though the seat belt 3 is subjected to a very large pulling force, pull-out of the seat belt 3 is reliably prevented and the passenger is protected with assurance.

In the embodiment set forth above, the present invention is described based upon use of the comfort device disclosed in the specification of Japanese Patent Application Laid-Open No. 1-141147. However, the invention is applicable also to a seat belt retractor using another type of comfort device. In addition, the invention is applicable also to a seat belt retractor in which an accessory device other than a comfort device is provided in coaxial relation with the reel shaft.

Furthermore, in the foregoing embodiment, a case is described in which the invention is applied to a seat belt retractor so adapted that tension is applied the seat belt 3 by biasing-force applying means. However, the invention is applicable also a tensionless seat belt retractor.

As many apparently widely different embodiments of the present invention can be made without departing from the spirit and scope thereof, it is to be understood that the invention is not limited to the specific embodiments thereof except as defined in the appended claims.

What is claimed is:

1. A seat belt retractor for use in a vehicle and having at least a reel shaft which receives a biasing force of a spring for taking up a seat belt, and a frame for supporting said reel shaft, and which is equipped with frame locking-type locking means in which, when deceleration in excess of a predetermined deceleration value acts upon the vehicle, said reel shaft moves so that teeth, which are formed on the reel shaft, engage with teeth formed on the frame, thereby locking the reel shaft against rotation;

characterized in that one end of two ends of said reel shaft is pivotably secured to said frame so that said reel shaft pivots about said one end when deceleration in excess of the predetermined deceleration value acts upon the vehicle, whereby teeth formed on the other end of said reel shaft engage with the teeth of said frame; and wherein only said other end of said reel shaft is movable when deceleration in excess of the predetermined deceleration value acts upon the vehicle and when there is an absence of a pulling force on the seat belt in excess of a predetermined pulling force value, and wherein both said one end and said other end of said reel shaft have teeth and are both movable for engaging with respective teeth formed in said frame when a pulling force in excess of the predetermined pulling force value acts upon the seat belt.

2. The seat belt retractor according to claim 1, wherein said one end of said reel shaft is provided with a comfort device.

3. A seat belt retractor according to claim 1, further comprising a seat belt lock actuating means at said other end of said reel shaft for pivoting about a first pivot point disposed radially outwardly from an axis of said reel shaft such that said other end moves to engage respective teeth in said frame when deceleration in excess of the predetermined deceleration value acts upon the vehicle.

4. A seat belt retractor according to claim 3, further comprising a second pivot point at said one end of said reel shaft disposed radially outwardly from the axis of said reel shaft whereby a pivoting about both pivot points allows for movement of both ends of said reel shaft when a pulling force in excess of a predetermined pulling force value acts upon the seat belt.

5. A seat belt retractor for use in a vehicle and having at least a reel shaft which receives a biasing force of a spring for taking up a seat belt, and a frame for supporting said reel shaft, and which is equipped with frame locking-type locking means in which, when deceleration in excess of a predetermined deceleration value acts upon the vehicle, said reel shaft moves so that teeth, which are formed on the reel shaft, engage with teeth formed on the frame, thereby locking the reel shaft against rotation;

characterized in that said reel shaft is supported, at both its ends, on said frame, the teeth of said reel shaft are formed on both ends thereof, the teeth of said frame are formed to oppose respective ones of the teeth of said reel shaft, said reel shaft is attached to said frame and comprises pivoting means for allowing movement of a second end of said reel shaft so as to pivot about a first end of said reel shaft, and movement impeding means for preventing said first end of said reel shaft from moving relative to said frame in the absence of a pulling force in excess of a predetermined pulling force value, said movement impeding means being provided on said frame where said first end of the reel shaft is located, wherein when deceleration in excess of the predetermined deceleration value acts upon the vehicle, the second end of said reel shaft moves so as to pivot about said first end so that the teeth on said second end of the reel shaft engage with the teeth of said frame in opposition thereto, and wherein when a pulling force in excess of the predetermined pulling force value acts upon the seat belt, said movement impeding means allows movement of said first end of said reel shaft, whereby said reel shaft moves so that the teeth on both ends thereof engage with the respective ones of opposing teeth of said frame.

6. The seat belt retractor according to claim 5, wherein said one end of said reel shaft is provided with a comfort device.

7. A seat belt retractor according to claim 5, wherein said movement impeding means comprises a shear pin, which is ruptured by a shearing force generated when said pulling force higher than a predetermined pulling force value is applied on said seat belt.

8. A seat belt retractor for use in a vehicle and having at least a reel shaft which receives a biasing force of a spring for taking up a seat belt, and a frame for supporting said reel shaft, and which is equipped with frame locking-type locking means in which, when deceleration in excess of a predetermined deceleration value acts upon the vehicle, said reel shaft moves so that teeth, which are formed on the reel shaft, engage with teeth formed on the frame, thereby locking the reel shaft against rotation;

characterized in that one end of two ends of said reel shaft is pivotably secured to said frame so that said reel shaft pivots about said one end when deceleration in excess of the predetermined deceleration value acts upon the vehicle, whereby teeth formed on the other end of said reel shaft engage with the teeth of said frame; and wherein a seat belt lock actuating means is provided at said other end of said reel shaft for pivoting about a first pivot point disposed radially outwardly from an axis of said reel shaft such that said other end moves to engage respective teeth in said frame when deceleration in excess of the predetermined deceleration value acts upon the vehicle.

9. A seat belt retractor for use in a vehicle and having at least a reel shaft which receives a biasing force of a spring for taking up a seat belt, and a frame for supporting said reel shaft, and which is equipped with frame locking-type locking means in which, when deceleration in excess of a predetermined deceleration value acts upon the vehicle, said reel shaft moves so that teeth, which are formed on the reel shaft, engage with teeth formed on the frame, thereby locking the reel shaft against rotation;

characterized in that one end of two ends of said reel shaft is pivotably secured to said frame so that said reel shaft pivots about said one end when deceleration in excess of the predetermined deceleration value acts upon the vehicle, whereby teeth formed on the other end of said reel shaft engage with the teeth of said frame; and a shear pin is provided disposed toward the one end of the reel shaft for shearing off when a pulling force in excess of a predetermined pulling force value acts upon the seat belt.

* * * * *